United States Patent
Bai et al.

(10) Patent No.: US 9,418,192 B1
(45) Date of Patent: Aug. 16, 2016

(54) PASS ECO FLOW BASED ON REDUCED TIMING SCOPE TIMER

(71) Applicant: Atoptech, Inc., Santa Clara, CA (US)

(72) Inventors: Geng Bai, Fremont, CA (US); Jianjun Wang, Fremont, CA (US)

(73) Assignee: Atoptech, Inc., Santa Clara, CA (US)

( * ) Notice: Subject to any disclaimer, the term of this patent is extended or adjusted under 35 U.S.C. 154(b) by 0 days.

(21) Appl. No.: 14/092,797

(22) Filed: Nov. 27, 2013

Related U.S. Application Data

(60) Provisional application No. 61/735,818, filed on Dec. 11, 2012, provisional application No. 61/805,790, filed on Mar. 27, 2013.

(51) Int. Cl.
*G06F 9/455* (2006.01)
*G06F 17/50* (2006.01)

(52) U.S. Cl.
CPC ........ *G06F 17/5081* (2013.01); *G06F 17/5072* (2013.01)

(58) Field of Classification Search
USPC ......................................................... 716/113
See application file for complete search history.

(56) References Cited

U.S. PATENT DOCUMENTS

| | | | |
|---|---|---|---|
| 2007/0106969 A1* | 5/2007 | Birch et al. ........................ | 716/6 |
| 2007/0234266 A1* | 10/2007 | Chen et al. ...................... | 716/13 |
| 2009/0055787 A1* | 2/2009 | Oh et al. ............................ | 716/6 |

* cited by examiner

*Primary Examiner* — Bryce Aisaka
(74) *Attorney, Agent, or Firm* — Van Pelt, Yi & James LLP

(57) ABSTRACT

Modifying a circuit includes: obtaining timing information of the circuit, wherein the timing information includes timing information pertaining to a critical path of the circuit; determining a scope associated with the critical path, the scope including a subset of the circuit; and performing a fix based at least in part on physical information associated with the circuit to improve timing of the scope.

19 Claims, 5 Drawing Sheets

PASS ECO FLOW BASED ON REDUCED TIMING SCOPE TIMER

CROSS REFERENCE TO OTHER APPLICATIONS PASS ECO FLOW BASED ON REDUCED TIMING SCOPE TIMER

This application claims priority to U.S. Provisional Patent Application No. 61/735,818 entitled PERFORMING A PASS TIMING ECO filed Dec. 11, 2012 which is incorporated herein by reference for all purposes.

This application claims priority to U.S. Provisional Patent Application No. 61/805,790 entitled PASS ECO FLOW BASED ON REDUCED TIMING SCOPE TIMER filed Mar. 27, 2013 which is incorporated herein by reference for all purposes.

BACKGROUND OF THE INVENTION

Modern Very Large Scale Integration (VLSI) design flow typically has two major stages: the implementation stage and the sign-off stage. The implementation stage typically starts with a circuit design including a gate level netlist. Logic cells are placed on a layout and connected by metal lines. The logic cell placement and metal line routing are optimized based on timing analysis results. A Place-and-Route (P&R) tool is usually deployed at the implementation stage. The sign-off stage typically starts with final design out of P&R tool. Analysis is performed to simulate circuit behavior in real silicon. RC extraction tools and static timing analyzers (STAs) are typically used at the sign-off stage. A circuit design must be free of timing violations in its sign-off timing results before it can be delivered to a semiconductor foundry for manufacture.

Timing is analyzed in both the implementation stage and the sign-off stage. During a timing analysis, the design operates under a set of corner cases or modes (also referred to as scenarios), and timing results such as delay and slack of circuit paths are determined. During the implementation stage, to speed up the design cycle, designers tend to apply a limited set of scenarios compared with the sign-off stage. Even if the same scenario is analyzed in both stages, due to different implementations of how the circuit is modeled, there can be differences in timing analysis results.

In order to close the timing gap between the implementation stage and the sign-off stage, chip designers usually adopt an extra Engineering Change Order (ECO) flow, during which simple optimization moves (also referred to as adjustments or fixes) such as buffer resizing and insertion are applied to the whole logic design to fix timing violations identified by the sign-off timer. However, the typical ECO flow requires a long time to run and only permits simple optimization techniques. These issues arise because physical layout information such as the wire routing pattern is usually not available during the optimization process, yet the logical optimization moves can impact the wire routing pattern which in turn can impact the timing of the design, thus requiring multiple iterations during which full timing analysis is performed on the entire circuit.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A Physical-Aware Scope-based Sign-off (PASS) ECO flow technique is described. In some embodiments, during a PASS ECO flow, timing information of a critical path of the circuit is obtained, and a scope associated with the critical path is determined. In some embodiments, the scope includes the critical path as well as a set of external components that affect the timing of the critical path. Based at least in part on physical information such as route information and placement information, a fix (also referred to as an optimization move) is determined to improve the timing of the scope.

Figure 1:
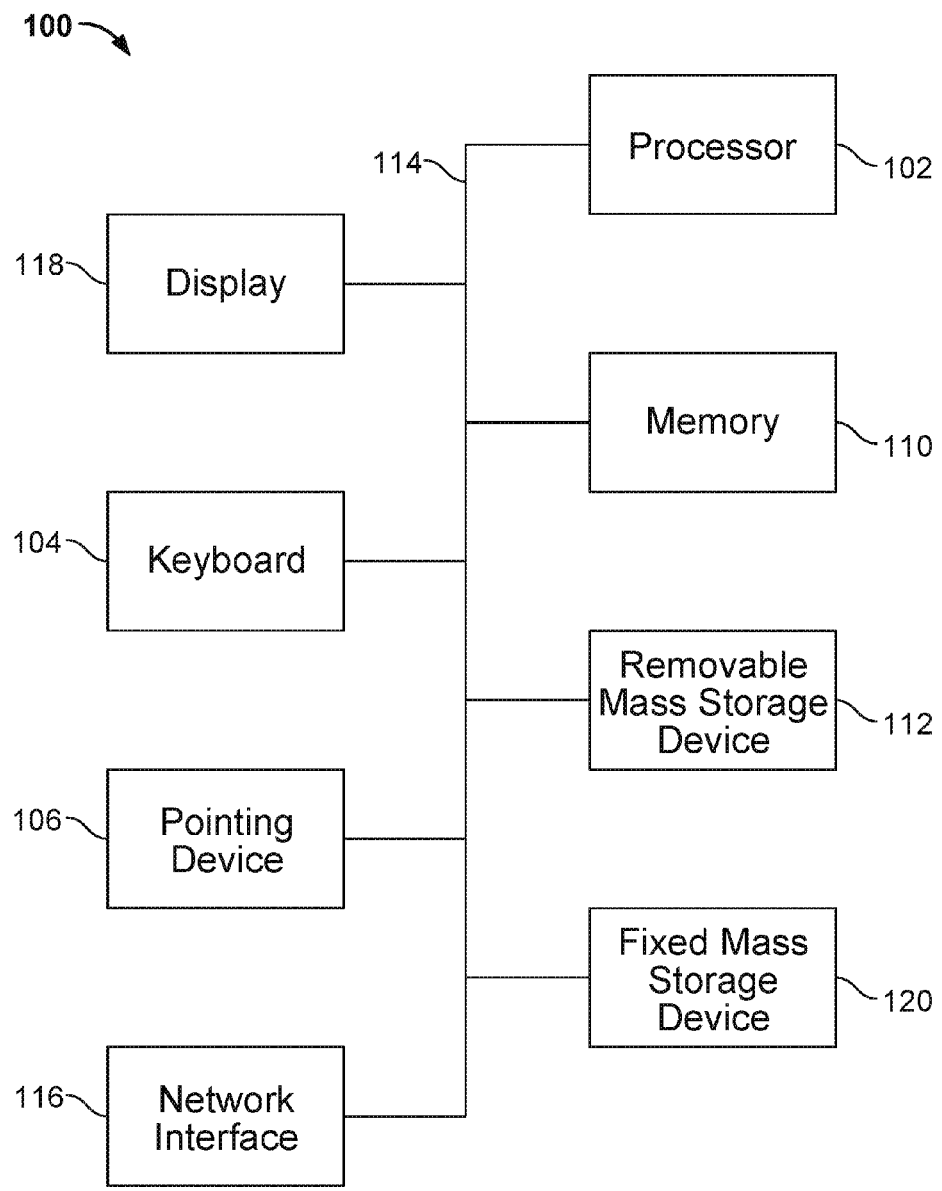
FIG. 1 is a functional diagram illustrating a programmed computer system for executing a PASS ECO flow in accordance with some embodiments.

FIG. 1 is a functional diagram illustrating a programmed computer system for executing a PASS ECO flow in accordance with some embodiments. As will be apparent, other computer system architectures and configurations can be used to perform a PASS ECO flow. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the processes described below with respect to FIGS. 3 and 5.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
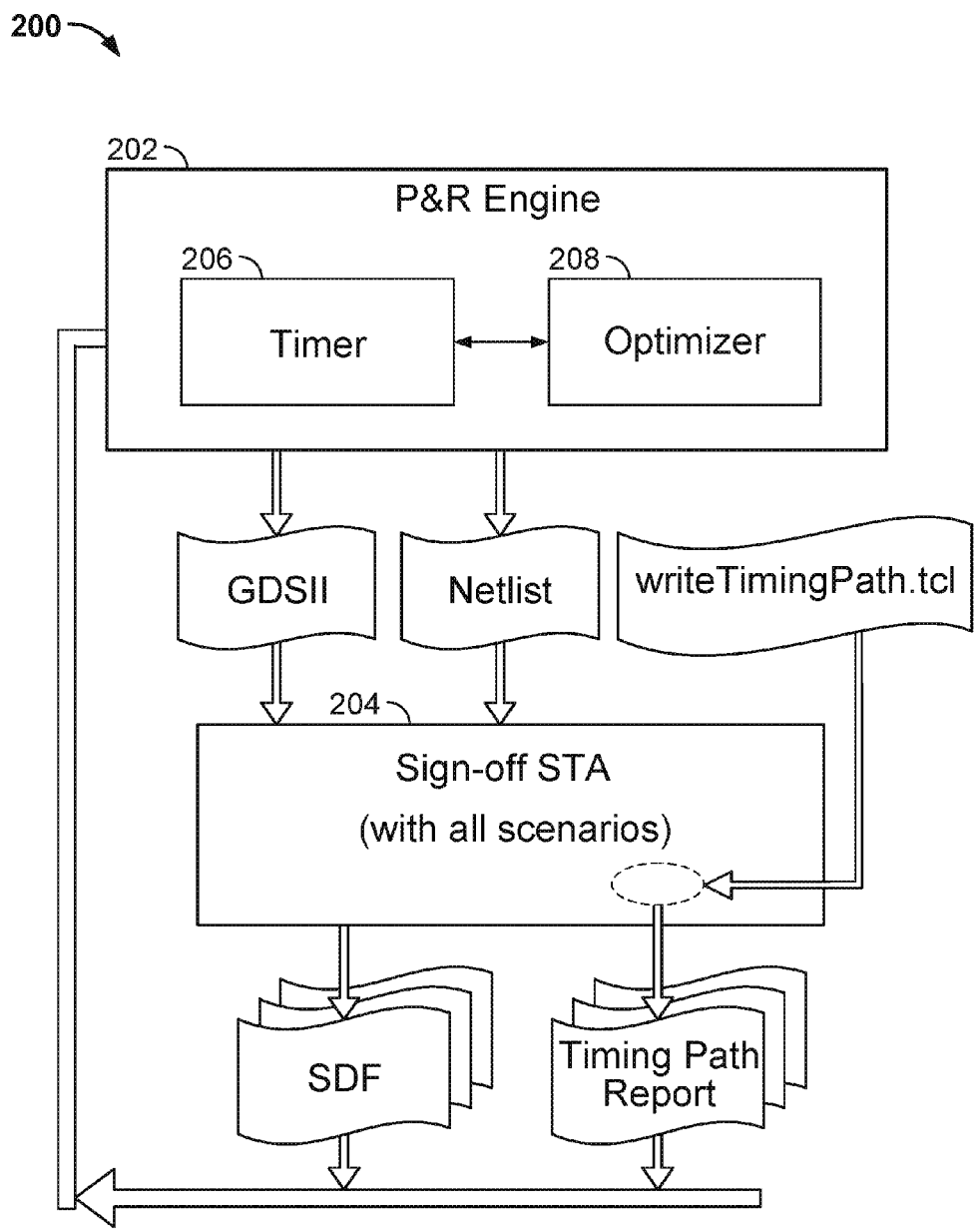
FIG. 2 is a block diagram illustrating an embodiment of a circuit design sign-off platform.

FIG. 2 is a block diagram illustrating an embodiment of a circuit design sign-off platform. In this example, platform 200 includes a P&R engine 202 and a sign-off timer (also referred to as a static timing analyzer (STA)) 204. An example of P&R engine 202 is Aprisa™ by ATopTech. The sign-off timer is typically a third party tool by another vendor, such as GoldTime™. P&R engine 202 and sign-off timer 204 can be implemented on different devices or on the same device, as separate processes. In the embodiment shown, P&R engine 202 and sign-off timer 204 communicate using predefined file formats and/or predefined Application Programming Interfaces (APIs).

In this example, P&R engine 202 receives as inputs logical circuit design information such as netlist files, library files, specification and description language (SDC) files, as well as RC/Wire description files, etc. The P&R engine makes physical placement and routing decisions of the logical circuit. The P&R engine includes a timer 206 configured to perform timing analysis on the circuit design and an optimizer 208 configured to make appropriate optimization moves to the circuit design to improve timing and achieve timing closure for a selected set of scenarios. Initially, during the implementation stage, based on its inputs and using the selected set of scenarios, the timer generates as outputs a design netlist (e.g., a netlist file which includes a logical description of the circuit components and their interconnects) and physical design data (e.g., a Graphic Database System II (GDSII) file which includes physical placement data such as wiring positions and pin placements), and sends the outputs to sign-off timer (STA) 204. A full timing graph is generated at the initial implementation stage. As used herein, a timing graph refers to an abstraction of the circuit design comprising interconnected nodes and edges. The nodes and edges in the timing diagram represent the logic gates and their interconnections in the circuit.

Sign-off timer 204 is implemented as a separate timing analysis process with respect to the P&R engine and is invoked separately from the P&R engine. In some embodiments, sign-off timer 204 is supplied by a vendor different from that of the P&R engine. After a sign-off extraction tool (not shown) extracts parasitic resistance and capacitance from the design data, sign-off timer 204 performs different timing analysis than the P&R timer on the design to identify remaining timing violations. In some embodiments, all possible scenarios are applied. Sign-off timer 204 outputs a timing path report that includes information about critical paths with timing violations and a Standard Delay Format (SDF) file that includes the scenarios and timing data. In some embodiments, a full timing graph (also referred to as a timing tree) for all the paths and portions thereof is generated, in which critical paths with timing violations are specially marked. Sign-off timer 204 can use any appropriate critical path identification techniques to determine the critical path, including statistical and non-statistical techniques that are well known to those skilled in the art. In some embodiments, slack values of individual paths are determined, and a path having a slack value that does not meet a threshold is deemed to have a timing violation and therefore a critical path. As used herein, required time refers to time needed to reach the end point of a path, arrival time refers to the delay from the clock source to the end point of the path, and slack refers to the difference between required time and arrival time of the end point of a path.

The outputs of sign-off timer 204 is fed back to P&R engine 202, which calibrates its internal timer delay values to minimize the differences between the P&R engine's internal timer results and the sign-off timer's results. In some embodiments, the calibration involves applying a set of adjustment ratios applied to respective portions of a critical path. For example, if the P&R engine's timer determines that a portion of the critical path has a delay of 0.5 ns but the sign-off timer determines that the same portion of the critical path has a delay of 0.7 ns, then a ratio of 7/5 is applied to the delay determined by the P&R's timer to model the result that would be generated by the sign-off timer.

Based on the timing path reports, the calibrated timer of the P&R engine performs a PASS ECO flow to modify the circuit and adjust its timing. As will be described in greater detail below, during the PASS ECO flow, a timing scope associated with the critical path is identified by P&R engine 202. The timing scope includes a set of logic instances (also referred to as cells or components) that affect the timing of the critical path. Further optimization and analysis are performed on the timing scope rather than the entire circuit to achieve timing closure. Since the timing scope is small in size compared with the full circuit, the speed of PASS ECO flow can be much faster than the full design analysis.

Figure 3:
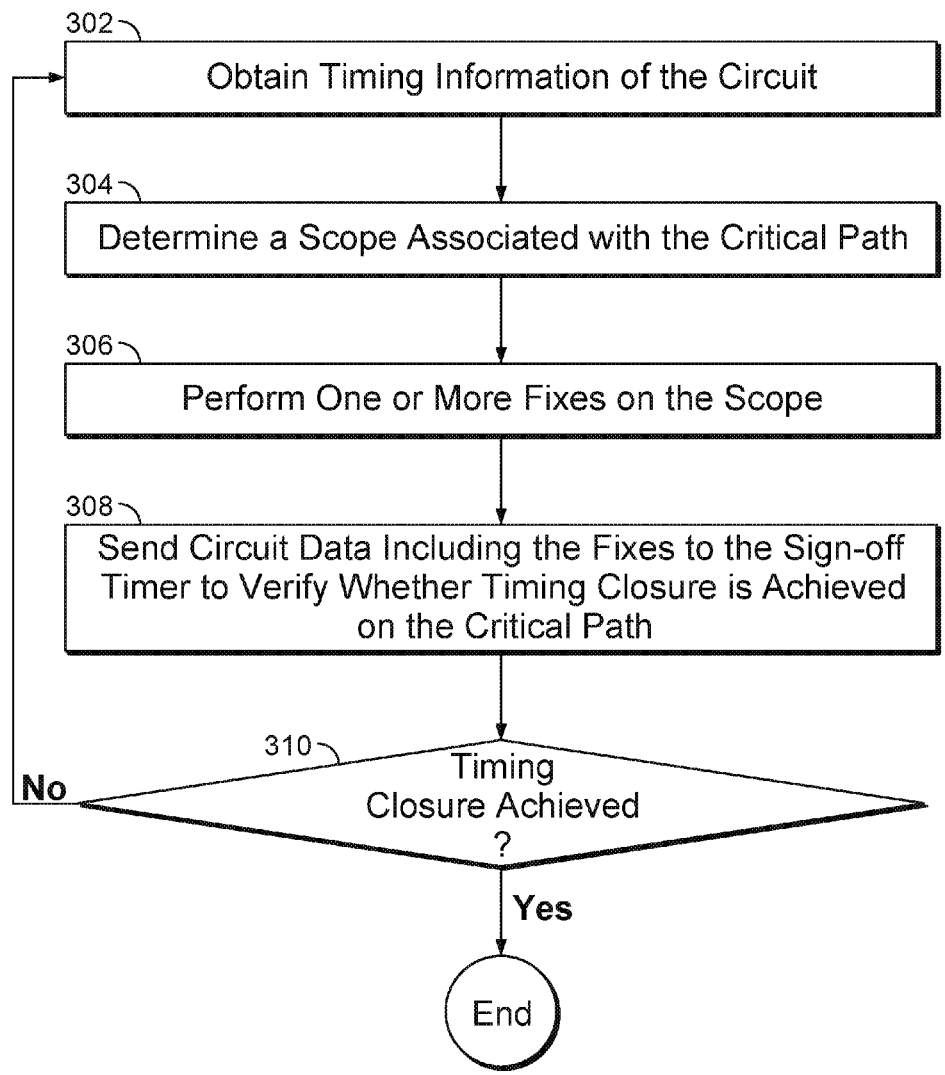
FIG. 3 is a flowchart illustrating an embodiment of a PASS ECO flow.

FIG. 3 is a flowchart illustrating an embodiment of a PASS ECO flow. In this example, process 300 is performed by a P&R engine such as 202.

At 302, timing information of the circuit is obtained. In some embodiments, the timing information is obtained from the output of a sign-off timer or a separate timing analysis process, which exports the timing information to the P&R engine as one or more files with predefined formats or transfers the timing information via predefined APIs. The timing information includes timing information (e.g., delays) of one or more paths of the circuit with timing violations as determined by the sign-off timer. As discussed above, the timing information of the timing-violating paths can be output as a special timing graph with only the timing-violating paths or a full timing diagram with the timing-violating paths specially marked.

At 304, a scope associated with a critical path is determined. In some embodiments, the critical path is the one with the worst timing (e.g., the most negative slack). As will be described in greater detail below, the scope is a subset of the circuit and is comprised of the critical path itself and any additional circuit components that affect the timing of the critical path. In some embodiments, a set of rules are applied to determine the scope. Detailed examples of the rules are explained in connection with FIG. 4 below.

At 306, one or more fixes are performed on the scope. The fixes are based at least in part on physical information associated with the circuit to improve timing (e.g., to increase slack and achieve timing closure). Examples of physical information include route information and placement information of the circuit, such as the locations, geometry, and layouts of wires, pins, etc. Optionally, logical information associated with the circuit, such as the types of logic instances and the logical connections between the logical instances, is also used during optimization. Since the fixes are limited to the scope, which in some cases constitute less than 5% of the overall circuit, the fixes can be done efficiently. Details of how the fixes are performed are explained in connection with FIG. 5 below.

At 308, circuit data including the fixes is re-sent to the sign-off timer, which again performs timing analysis to verify whether timing closure is achieved on the critical path. If timing closure is achieved at 310, the process completes. If timing closure is still not achieved at 310, 302-308 are repeated until timing closure is achieved. Process 300 may be repeated until all the critical paths identified by the sign-off timer are fixed to achieve timing closure. In some embodiments, the critical paths are processed in parallel by the P&R engine, and the circuit data that includes all the fixes to all the critical paths is sent to the sign-off timer.

Figure 4:
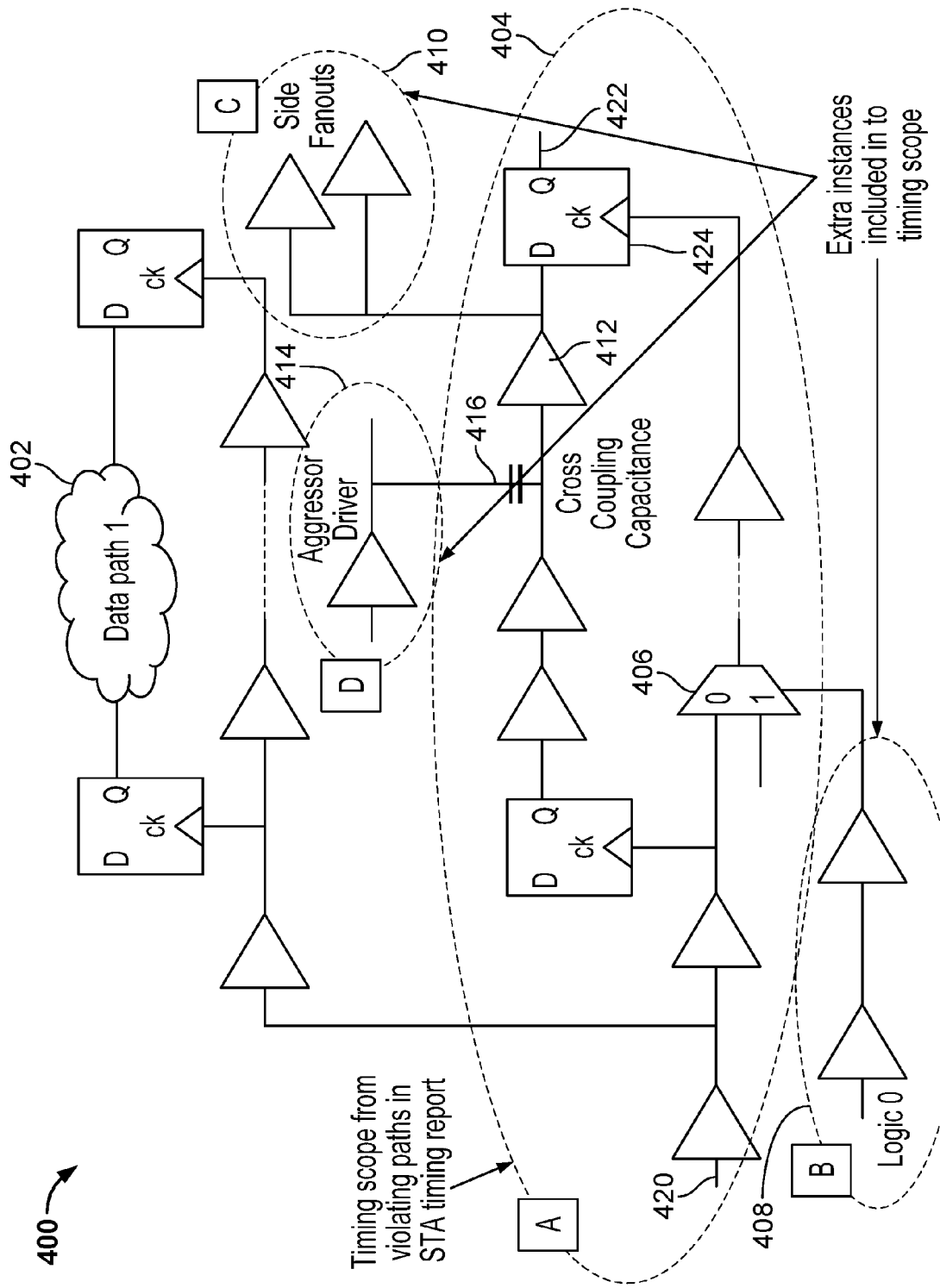
FIG. 4 is an example circuit diagram illustrating how to determine the scope associated with a critical path.

FIG. 4 is an example circuit diagram illustrating how to determine the scope associated with a critical path.

A circuit typically includes sequential cells (also referred to as P cells) which are cells with memory, and combinational cells (also referred to as D cells) which are cells without memory. Examples of sequential cells include flip-flops, latches, etc. Examples of combinational cells include buffers, inverters, logical gates, etc.

As used herein, a path that has a timing violation is deemed to be a critical path. A data path refers to a portion of the circuit between two sequential cells. A clock path refers to the portion of the circuit from the clock source to the first sequential cell. The timing of a critical path (e.g., the propagation time required for a signal to travel from the beginning of the path to the end of the path) is computed based on data paths and optionally on clock paths.

In this example, example circuit 400 includes multiple data paths and clock paths. Example circuit is used for purposes of illustration only and the technique is generally applicable to circuits with critical paths. Selected portions of the paths are shown for purposes of illustration and the circuit shown is not necessarily a complete circuit diagram. In this example, the STA timing report indicates that path 402 meets the timing requirement (e.g., the slack of the data path is greater than or equal to 0), while path 404 has sign-off timing violation (e.g., the slack of the data path between input pin 420 and output pin 422 is less than 0). The slack of path 404 is computed based on the delays of its elements using known techniques.

The timing scope is determined by identifying and grouping a set of logic instances of the circuit that affect the timing result of the critical path. In this example, the following set of rules is applied to determine the timing scope:

A) All the logic instances in the critical path are included in the timing scope. In the example shown, all the logical instances on path 404 that are used in the timing calculation (enclosed by the circle labeled A) are included in the timing scope.

B) One or more additional logic instances required to correctly analyze signal propagation to guarantee the expected timing results for the critical path are also included in the timing scope. In some embodiments, a set of additional logical instances is included when the set of additional logical instances contributes to a logic state that leads to a timing violation of the critical path. For example, the STA timing report indicates that data path 404 only has a sign-off timing violation when switch 406 is turned on. Since a signal propagating through logic instances in path 408 (enclosed by the circle labeled B) is required to turn on switch 406, path 408 contributes to the timing violation of critical path 404 and is included in the timing scope, even though path 408 is not a part of data path 404.

C) One or more logic instances that contribute to an external load of the critical path are also included in the timing scope. As used herein, an external load refers to one or more components connected to the outputs of a component of interest (e.g., fanouts of a logic instance on the critical path). Since the external load impacts timing of the critical path, the external load such as fanout logic instances is required to be included in timing analysis to guarantee accurate timing results for the critical path. In the example shown, logic instances on path 410 (enclosed by the circle labeled C) are fanouts of logic instance 412 on critical path 404, and are included in the timing scope.

D) One or more logic instances that are coupled to the critical path through cross-coupling capacitance are also included in the timing scope. Cross-coupling capacitances (also referred to as cross-talk capacitances) are parasitic capacitances between separate interconnected metal lines. The value of a cross-coupling capacitance is calculated by the P&R tool's internal RC extraction engine. The metal line on the critical path is referred to as the victim net. The other metal line is referred to as the aggressor net. There are external logic instances acting as drivers to the aggressor nets, and the activities of these drivers change the timing of the critical path. For example, when the output of an external buffer transitions from high to low, the buffer injects a certain amount of current to the victim net through cross-coupling capacitance and the critical path timing is impacted. Thus, these external logic instances are required to guarantee accurate timing results for the critical paths. In the example shown, the logic instance on path 414 (enclosed by the circle labeled D) is included in the timing scope because it is coupled to critical path 404 via a cross-coupling capacitance 416.

In summary, the scope of the critical path in FIG. 4 includes logic instances on paths 404, 408, 410, and 414. Once the set of logic instances included in the timing scope is determined, fixes are performed on the timing scope to improve timing. In some embodiments, the optimization engine accounts for physical information (e.g., P&R information) when determining the fixes.

Figure 5:
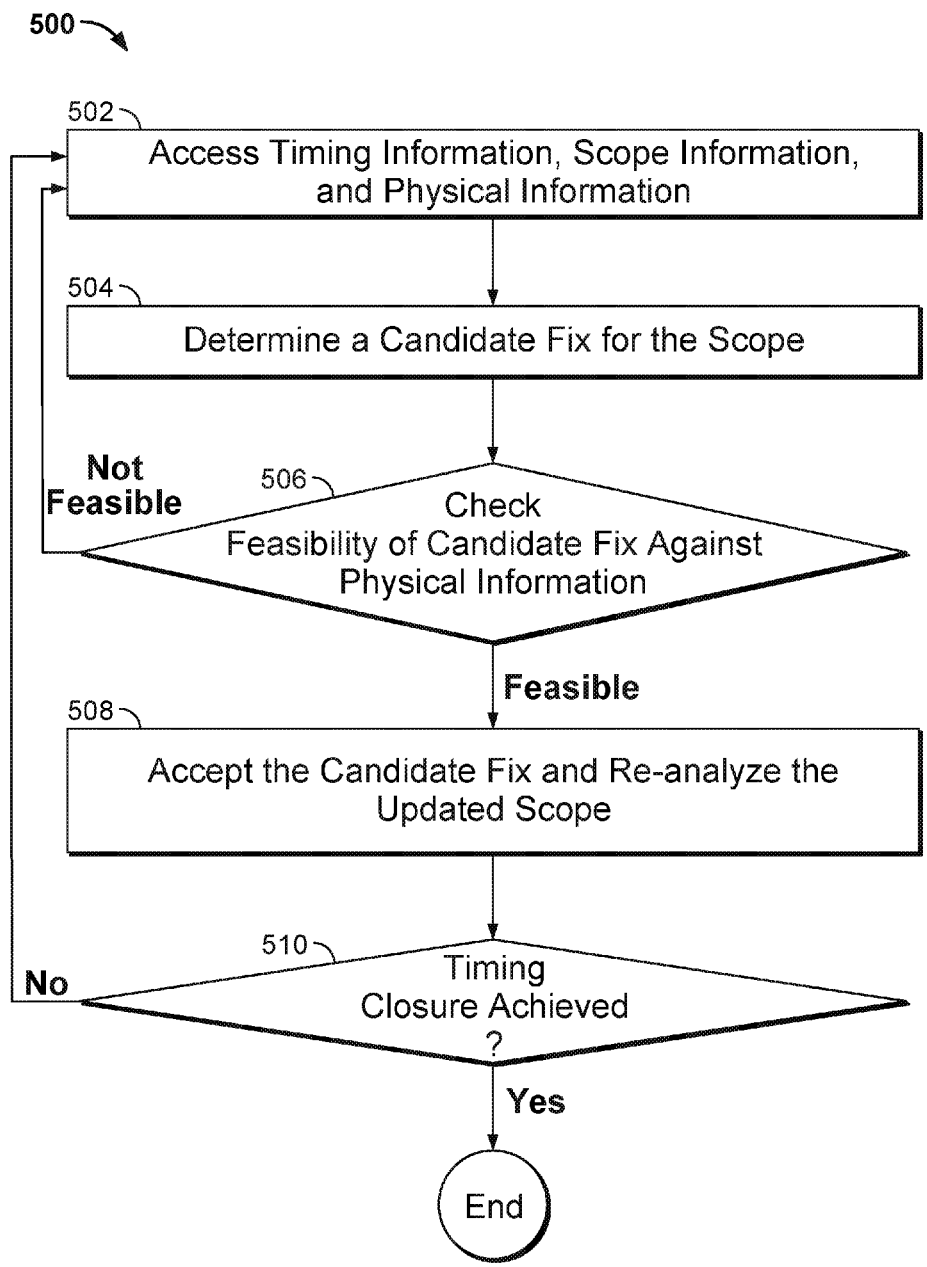
FIG. 5 is a flowchart illustrating an embodiment of a process for performing physically aware fixes on the timing scope.

FIG. 5 is a flowchart illustrating an embodiment of a process for performing physically aware fixes on the timing scope. Process 500 can be used to implement 306 of process 300.

At 502, scope information, timing information, and physical information are accessed. In this example, the scope information includes information pertaining to the logic instances included in the critical path and the logic instances that affect the timing of the critical path determined using the rules described above in connection with FIG. 4. In some embodiments, the timing information includes a timing graph with delay and/or slack information associated with at least the scope, and the physical information includes P&R data such as layout, positioning, and geometry information. In some embodiments, full P&R data for the entire circuit is available. As will be discussed below, access to full physical information makes it possible to make fixes within the scope without impacting the physical layout of the whole circuit.

At 504, a candidate fix for the scope is determined. A number of optimization moves are possible, including logical fixes such as resizing a component, adding or removing a buffer, replacing a component with another component with greater driving strength, local area logic re-synthesis, etc., as well as physical fixes such as changing the location of a route to reduce crosstalk, Various techniques of how to determine the potential fix can be applied, including ones well known to those skilled in the art. In some embodiments, the candidate fix is determined by applying a set of rules. For example, the rules may specify that the candidate fix be made at a cell immediately before there are fanouts, and that the cell be enlarged to twice its current size. Many other appropriate rules may be applied based on design preferences. In some embodiments, the set of rules includes a cost (or benefit) function that determines locally the impact of the potential fix. For example, when a cell is enlarged, there is positive impact to timing, but negative impact to power consumption, circuit area, location congestion, etc. The factors are considered together to formulate a cost (or benefit) function that reflects the total cost (or benefit) of a particular fix. The fix that achieves the lowest cost value (or the highest benefit value) is selected as the candidate fix. In some embodiments, a number of potential fixes are evaluated and ranked based on their respective scores so a next best potential fix can easily be identified at a later time. In some embodiments, the scores include worst negative slack (WNS), total negative slack (TNS), design rule violation (DRV), etc.

At 506, the candidate fix is checked against physical information to determine whether the fix is feasible. As discussed above, in some embodiments, the physical information includes the full P&R information of the circuit. Thus, the candidate fix can be checked against the full physical layout of the circuit to ensure that the fix is physically feasible (in other words, the fix meets the physical constraints of the circuit layout). If the fix involves adding or resizing a component, the physical information is checked to see if there is space available to accommodate the added or resized component. Referring to FIG. 4 as an example, if the fix is to add a buffer before logic instance 412, then the physical layout of circuit 400 is checked to determine whether there is space to add the new buffer, and if so, where it should be placed. As another example, if a route needs to be changed, the physical information is checked to see if there may be conflicting routes in the new location. Referring again to FIG. 4, if the route between 412 and 424 should be changed, the physical layout is checked to make sure that the changed route does not interfere with other nearby routes such as the routes between 412 and the fanout instances.

If the candidate fix is not feasible, it is discarded and control is transferred to 502, where the current timing, scope, and physical layout information is again accessed to determine another candidate fix, and 502-506 are repeated. If the candidate fix is feasible, at 508, it is accepted (e.g., incorporated into the circuit). Accordingly, the scope is also updated. In some embodiments, the update includes adding the fix to the original scope and identifying any additional logical instances that should be included in the new scope according to the rules. The updated scope with the fix is re-analyzed to determine whether timing closure of the critical path is achieved. The same timing analysis techniques as those used to identify the critical path can be used. For example, the slack of the path with the updated scope is computed. If timing closure is achieved, the process completes for this critical path; otherwise, control is transferred to 502 and 502-510 are repeated until timing closure is achieved. In some embodiments, the timing of the critical path with the fix is computed by the P&R's timer, which calibrates the computed timing results to conform to the sign-off timer as described above (e.g., by applying a set of adjustment ratios to the P&R's timer). Other techniques for determining whether timing closure is achieved can be used.

A PASS ECO flow has been described. In some embodiments, the PASS ECO is performed by a P&R tool with access to the full physical data of the circuit, on a scope associated with the critical path. The technique permits more efficient optimization and permits both logical and physical fixes to be made while observing the constraints of the physical layout.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for modifying a circuit, comprising:
   one or more processors configured to:
      obtain timing information of the circuit, wherein the timing information includes timing information pertaining to a critical path of the circuit;
      determine a scope associated with the critical path, wherein the scope includes:
         a first set of one or more logic instances in the critical paths;
         a second set of one or more logic instances required to correctly analyze signal propagation to guarantee an expected timing result for the critical path;
         a third set of one or more logic instances that are coupled to the critical path through cross-coupling capacitance; and
         a fourth set of one or more logic instances external to the critical path and directly coupled to one or more outputs of a logical instance on the critical path such that the fourth set of one or more logical instances contribute to one or more external loads of the critical path; and
      perform a fix based at least in part on physical information associated with the circuit to improve timing of the scope; and
   one or more memories coupled to the one or more processors, configured to provide the one or more processors with instructions.

2. The system of claim 1, wherein the timing information is obtained from a separate timing analysis process.

3. The system of claim 1, wherein the critical path includes a path with a timing violation.

4. The system of claim 1, wherein the second set of one or more logical instances and the third set of one or more logical instances include external logic instances that affect timing of the critical path.

5. The system of claim 1, wherein the physical information includes route information and placement information.

6. The system of claim 1, wherein to perform the fix is further based at least in part on logical information associated with the circuit.

7. The system of claim 1, wherein the one or more processors are further configured to perform timing analysis on the scope, including to compute timing of the scope and to calibrate a computed result of the computed timing of the scope to conform to a separate timing analysis process that generated the timing information.

8. The system of claim 1, wherein to perform the fix based at least in part on the physical information associated with the circuit to improve timing of the scope includes to:
   access scope information, timing information, and physical information;
   determine a candidate fix for the scope;
   determine feasibility of the candidate fix based on the physical information; and
   accept the candidate fix in the event that the candidate fix is deemed to be feasible.

9. The system of claim 8, wherein the candidate fix includes a logical fix, a physical fix, or both.

10. A method of modifying a circuit, comprising:
    obtaining timing information of the circuit, wherein the timing information includes timing information pertaining to a critical path of the circuit;
    determining, using one or more computer processors, a scope associated with the critical path, wherein the scope includes:
       a first set of one or more logic instances in the critical paths;
       a second set of one or more logic instances required to correctly analyze signal propagation to guarantee an expected timing result for the critical path; and
       a third set of one or more logic instances that are coupled to the critical path through cross-coupling capacitance; and
       a fourth set of one or more logic instances external to the critical path and directly coupled to one or more outputs of a logical instance on the critical path such that the fourth set of one or more logical instances contribute to one or more external loads of the critical path; and
    performing a fix based at least in part on physical information associated with the circuit to improve timing of the scope.

11. The method of claim 10, wherein the timing information is obtained from a separate timing analysis process.

12. The method of claim 10, wherein the critical path includes a path with a timing violation.

13. The method of claim 10, wherein the second set of one or more logical instances and the third set of one or more logical instances include external logic instances that affect timing of the critical path.

14. The method of claim 10, wherein the physical information includes route information and placement information.

15. The method of claim 10, wherein performing the fix is further based at least in part on logical information associated with the circuit.

16. The method of claim 10, further comprising performing timing analysis on the scope, including computing timing of the scope and calibrating a computed result of the computed timing of the scope to conform to a separate timing analysis process that generated the timing information.

17. The method of claim 10, wherein performing the fix based at least in part on the physical information associated with the circuit to improve timing of the scope includes:
- accessing scope information, timing information, and physical information;
- determining a candidate fix for the scope;
- determining feasibility of the candidate fix based on the physical information; and
- accepting the candidate fix in the event that the candidate fix is deemed to be feasible.

18. The method of claim 17, wherein the candidate fix includes a logical fix, a physical fix, or both.

19. A computer program product for modifying a circuit, the computer program product being embodied in a tangible non-transitory computer readable storage medium and comprising computer instructions for:
- obtaining timing information of the circuit, wherein the timing information includes timing information pertaining to a critical path of the circuit;
- determining a scope associated with the critical path, wherein the scope includes:
  - a first set of one or more logic instances in the critical paths;
  - a second set of one or more logic instances required to correctly analyze signal propagation to guarantee an expected timing result for the critical path; and
  - a third set of one or more logic instances that are coupled to the critical path through cross-coupling capacitance; and
  - a fourth set of one or more logic instances external to the critical path and directly coupled to one or more outputs of a logical instance on the critical path such that the fourth set of one or more logical instances contribute to one or more external loads of the critical path; and
- performing a fix based at least in part on physical information associated with the circuit to improve timing of the scope.

* * * * *